United States Patent
Videen

(10) Patent No.: US 7,848,024 B2
(45) Date of Patent: Dec. 7, 2010

(54) CYLINDRICALLY SHAPED OPTICAL BEAMSPLITTER

(75) Inventor: Gorden Videen, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/022,325

(22) Filed: Jan. 30, 2008

(65) Prior Publication Data

US 2009/0190230 A1 Jul. 30, 2009

(51) Int. Cl.
*G02B 27/14* (2006.01)

(52) U.S. Cl. ...................................... 359/629

(58) Field of Classification Search .................. 359/629, 359/634, 639, 201.1, 207.6, 211, 1, 212, 359/2, 226.1
See application file for complete search history.

(56) References Cited

U.S. PATENT DOCUMENTS

| 4,290,667 A | 9/1981 | Chown |
| 2002/0044316 A1* | 4/2002 | Myers .......................... 359/115 |
| 2005/0241210 A1* | 11/2005 | Karcher et al. ................. 42/119 |
| 2007/0103788 A1* | 5/2007 | Magarill et al. .............. 359/634 |
| 2009/0190229 A1 | 7/2009 | Videen |

FOREIGN PATENT DOCUMENTS

| EP | 1283429 A2 * | 2/2003 |
| JP | 2005-181000 A | 7/2005 |

* cited by examiner

*Primary Examiner*—Alicia M Harrington
(74) *Attorney, Agent, or Firm*—Richard A. Morgan; Christos E. Kyriakou

(57) ABSTRACT

An optical beamsplitter comprises an optically-transparent material and a partially-reflective layer therein. The optically-transparent material has a cylindrically shaped exterior surface which provides advantages.

20 Claims, 3 Drawing Sheets

CYLINDRICALLY SHAPED OPTICAL BEAMSPLITTER

GOVERNMENT INTEREST

The invention described herein may be manufactured, used, and licensed by or for the United States Government without payment therefor.

CROSS-REFERENCE TO RELATED APPLICATION

This application is related to inventor's application titled Spherically Shaped Optical Beamsplitter filed on even date.

BACKGROUND OF THE INVENTION

1. Technical Field of the Invention

The invention relates to optical elements and methods. More specifically, the invention relates to an optical beamsplitter that can be used to propagate optical signals.

2. Description of the Related Art

A beamsplitter is an optical device that receives an incident light beam and divides it into two components. The first component is propagated from the beamsplitter as a transmitted beam. The second component is propagated as a reflected optical beam angularly displaced from the transmitted beam.

A conventional beamsplitter comprises a cube of optically-transparent material encasing a thin layer of semi-reflecting material oriented diagonally across the interior. About one-half of the light entering a face of the beamsplitter is reflected by the semi-reflecting material through an adjacent face as a reflected light beam. The remaining portion of the incident light beam is transmitted by the layer of semi-reflecting material through the opposite face as a transmitted light beam.

Beamsplitters are used in optical devices such as scanners, interferometers and back-scattering detectors for measuring back-scatter from particles. A problem associated with conventional cubic beamsplitters is distortion caused by light striking faces at oblique, i.e. non-perpendicular, angles. Transmission through the beamsplitter is refracted at the surface according to Fresnel's Equations. The refracted light beam is parallel to the incident beam and displaced from it. The magnitude of displacement depends on the angle of incidence and the index of retraction of optical materials in beamsplitter components. This distortion may be compensated for to some extent by repositioning components in an optical system.

U.S. Pat. No. 6,411,441 to Gorden Videen discloses a Beamsplitter Prism with Cylindrical Faces for Transmitting or Reflecting Cylindrical Waves Without Magnification.

SUMMARY OF THE INVENTION

A cylindrically shaped optical beamsplitter, system and method are provided. An optical beamsplitter comprises an optically-transparent material and a partially-reflective layer. The optically-transparent material has a first end, a second end and a cylindrically shaped exterior surface extending between the first end and the second end. The first end, second end and cylindrically shaped exterior surface define an interior. The partially-reflective layer is positioned at least partially within the interior.

A method for using an optical beamsplitter for scanning a sample is provided. The beamsplitter includes an optically-transparent material having a cylindrically shaped exterior surface and a partially-reflective layer contained therein. The method comprising the steps of:
(i.) rotating the optical beamsplitter to a first orientation with respect to the sample;
(ii.) passing light through the optical beamsplitter to the sample and receiving light reflected therefrom; and
(iii.) acquiring first information corresponding to the first orientation.

Other devices, systems, methods, features and/or advantages will be apparent to one with skill in the art upon examination of the following drawings and detailed description. It is intended that all such additional devices, systems, methods, features and/or advantages be included within this description.

BRIEF DESCRIPTION OF THE DRAWING

Many aspects of the disclosure can be better understood with reference to the drawing. The components in the drawing are not necessarily to scale. Like reference numerals designate corresponding parts throughout the several views.

DETAILED DESCRIPTION OF THE INVENTION

A cylindrically shaped optical beamsplitter, system and method are provided. The portion of the exterior surface of the beamsplitter that directs light is substantially cylindrically shaped. As a result, advantages are achieved. For example, light incident upon the beamsplitter is received at an angle normal to the exterior surface of the beamsplitter. Light propagated from the beamsplitter can be transmitted at an angle normal to the exterior surface. Therefore, at least some of the light received and transmitted is propagated without distortion.

Figure 1:
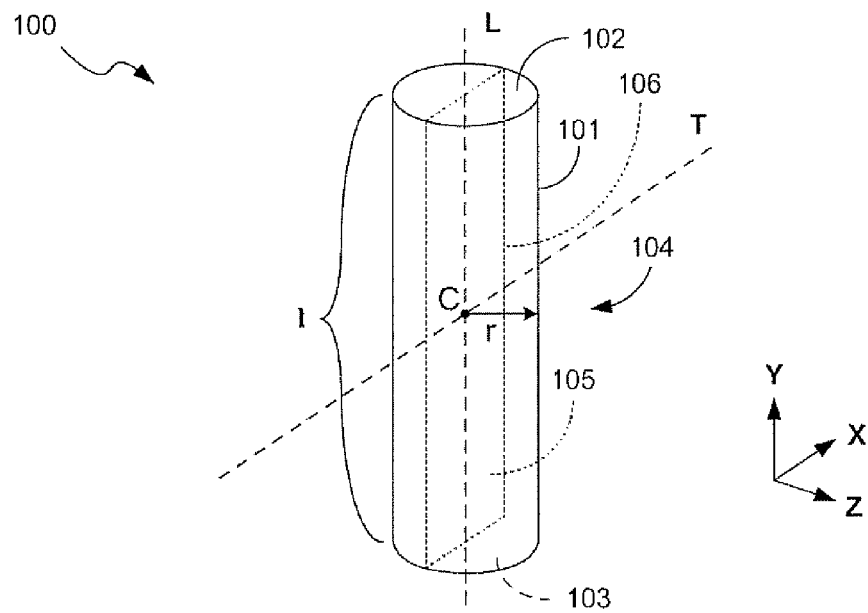
FIG. 1 is a schematic diagram of an embodiment of a cylindrically shaped optical beamsplitter.

Reference is made to the drawing. FIG. 1 is a schematic diagram showing a cylindrically shaped optical beamsplitter. Beamsplitter 100 is made of a material that is optically transparent with respect to at least one wavelength of light. For example, glass, quartz, plastic and epoxy are optically transparent to visible light. Quartz is transparent to ultraviolet light. Silicon and germanium are transparent to infrared light. The optically-transparent material may be optically transparent for more than one wavelength of light.

The exterior surface 101 of the material is defined by first and second ends 102, 103 that are generally planar and oppose each other. Portion 104 of the exterior surface that extends a length l between the first and second ends 102, 103 is defined by a substantially constant radius r extending from longitudinal axis L. In another embodiment, ends 102, 103 may be other than planar and/or cat be oriented differently than specifically shown.

Beamsplitter 100 also includes a partially-reflective layer 105 which is oriented generally within a plane that intersects center C. Two orthogonal axes, longitudinal axis L and transverse axis T, extend outwardly from center C. In FIG. 1, the L-T plane in which layer 105 is oriented is parallel to the X-Y plane.

The partially-reflective layer is formed of one or more materials known in the art for this use. In FIG. 1, the partially-reflective layer 105 is continuous and extends across the optically-transparent material. Partially-reflective layer 105 extends across the optically-transparent material so that its outer periphery 106 is adjacent to the exterior surface 101. In another embodiment, the partially-reflective layer 105 is discontinuous. The partially-reflective layer 105 may not extend to or in the alternative may extend beyond the exterior surface of the beamsplitter.

Figure 2:
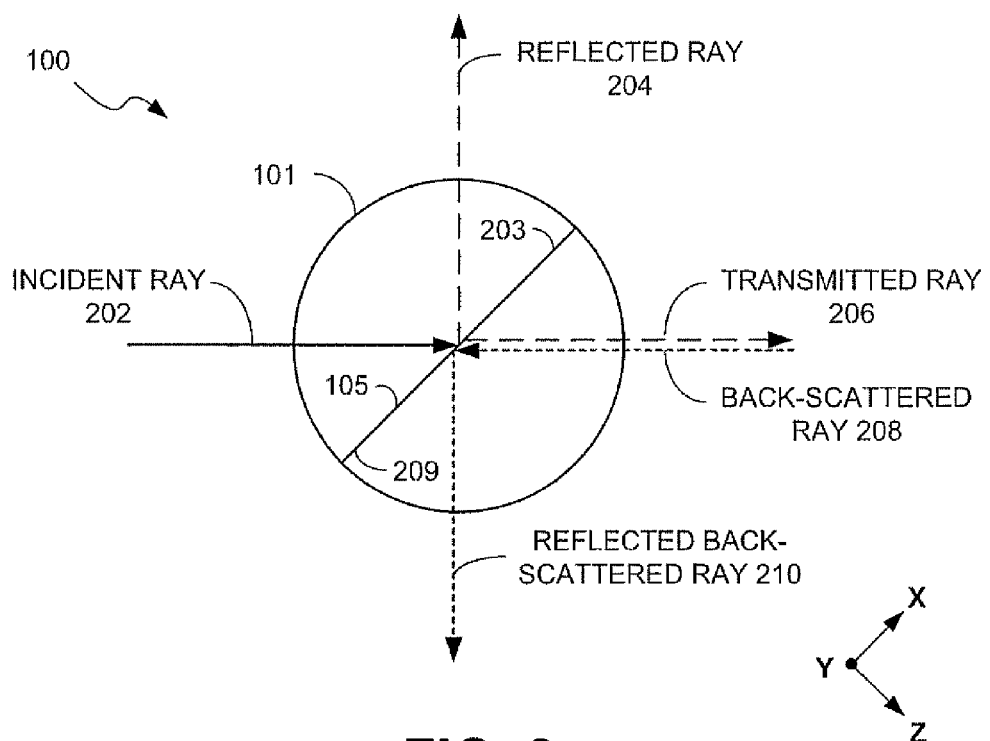
FIG. 2 is a schematic diagram of the embodiment of the beamsplitter of FIG. 1, depicting propagation of an incident ray and a back-scattered ray.

FIG. 2 is a schematic diagram of the beamsplitter of FIG. 1, showing propagation of an incident ray and a back-scattered ray. As shown in FIG. 2, incident ray 202 is received by beamsplitter 100 and is incident upon partially-reflective layer 105. Face 203 of the partially-reflective layer 105 reflects a first component of the incident ray. This first component is propagated from the beamsplitter as first reflected ray 204. The remaining portion of the incident ray is propagated through layer 105 and is transmitted from the beamsplitter as transmitted ray 206.

In FIG. 2, transmitted ray 206 is incident upon an object (not shown) that provides a back-scattered ray 208 to the beamsplitter. For ease of illustration both the transmitted ray 206 and back-scattered ray 208 are shown parallel to and laterally offset from each other. In reality, these rays are co-extensive.

Back-scattered ray 208 is received by the beamsplitter and is incident upon an opposing face 209 of the partially-reflective layer 105. A component of the back-scattered ray 208 is then reflected as a second reflected ray 210 that is propagated from the beamsplitter. Although not shown in FIG. 2, the partially-reflective layer 105 may transmit another component of the back-scattered ray 208. The ray shown is normal to the corresponding portion of the exterior surface of the beamsplitter to which it is incident.

Figure 3:
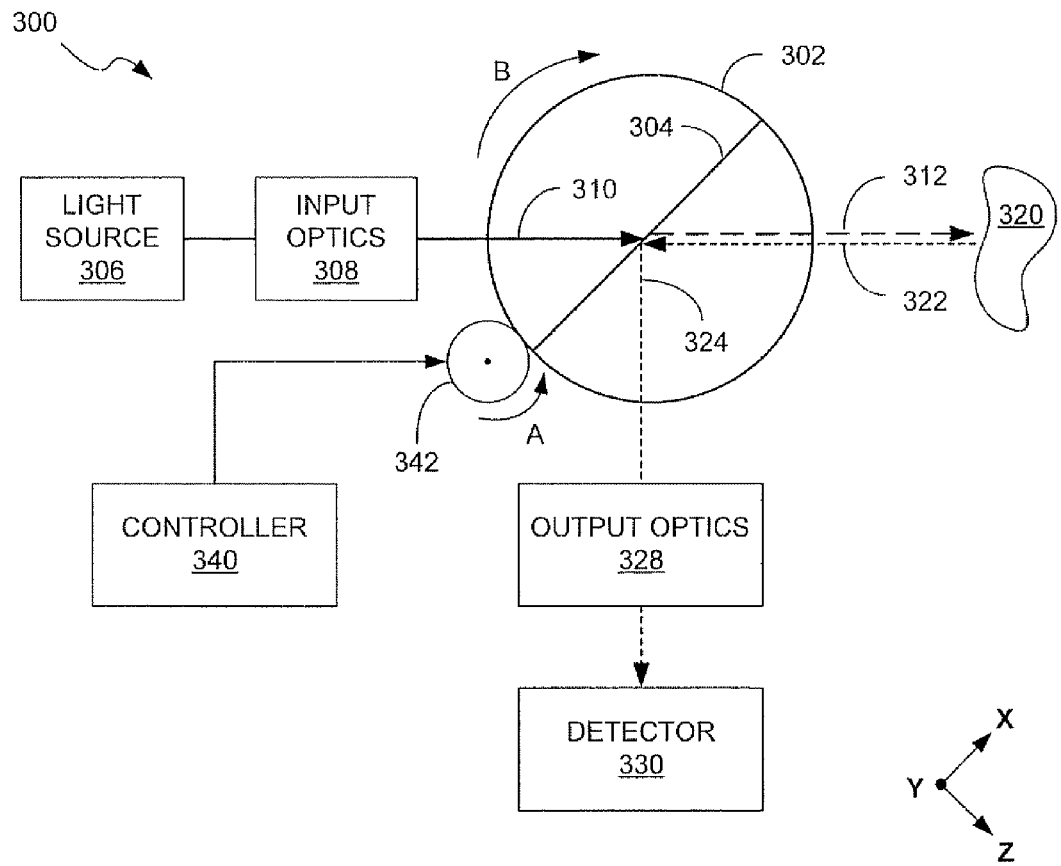
FIG. 3 is an embodiment of an optical system incorporating an embodiment of a cylindrically shaped optical beamsplitter.

Reference is made to FIG. 3. Optical system 300 includes a beamsplitter 302 incorporating a partially-reflective layer 304. Light source 306 provides light to optional input optics 308, which focuses light passed to the beamsplitter. The input optics can include a lens.

Light incident upon the beamsplitter shown as an incident ray 310, is passed through the beamsplitter to the partially-reflective layer 304. A component of the incident ray is transmitted through the beamsplitter as transmitted ray 312. The component of the incident ray reflected by the partially-reflective layer is not shown. Transmitted ray 312 is directed toward sample 320 that scatters incident light. A component of the scattered light comes back to the beamsplitter as back-scattered ray 322. Back-scattered ray 322 is then reflected by the partially-reflective layer 304. Back-scattered reflected ray 324 provided to optional output optics 328. Output optics can include one or more lenses for focusing the reflected back-scattered ray 324. The back-scattered reflected ray 324 is then provided to detector 330 that analyzes the light. For example, the detector 330 can be an electronic detector such as a photomultiplier tube (PMT), a photodiode (PDA) or a charge-coupled device (CCD). Detector 330 can be a non-electronic detector such as photosensitive film or a human eye. The component of the back-scattered ray 322 that is not reflected by partially-reflective layer 304 is not shown in FIG. 3.

Optical system 300 also includes controller 340 and rotation mechanism 342 used to rotate beamsplitter 302 with respect to at least one axis of rotation. Rotation mechanism contacts the beamsplitter so that movement of the rotation mechanism rotates the beamsplitter. As shown in FIG. 3, Controller 340 provides an input signal to rotation mechanism 342 to cause rotation as indicated by arrow A. In response, beamsplitter 302 rotates as indicated by arrow B. The rotation mechanism can be configured so that the beamsplitter can be rotated with respect to more than one axis. The beamsplitter can also be rotated with the light source.

The opposing ends of a cylindrically shaped beamsplitter are not used for propagating light. Therefore unlike the embodiment shown in FIG. 3 in which the rotation mechanism contacts the cylindrically shaped portion of the exterior surface, the ends can be used to attach a rotation mechanism.

Another embodiment of an optical system is a variation of that shown in FIG. 3. What is different is that the position of both light source 306 and input optics 308 is exchanged with the position of both detector 330 and output optics 328. As beamsplitter 302 is rotated, incident light from the source scans object 320. Backscattered light from object 312 is transmitted to the output optics and detector.

Figure 4:
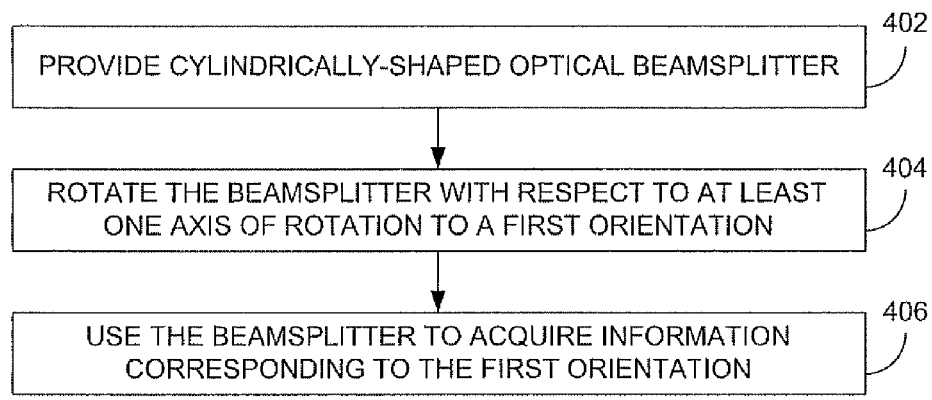
FIG. 4 is a flowchart depicting functionality of the embodiment of the optical system of FIG. 3.

The optical system of FIG. 3 is described with reference to the flowchart of FIG. 4. The method begins at block 402 where a cylindrically shaped optical beamsplitter is shown. In block 404, the beamsplitter is rotated with respect to at least one axis of rotation to a first orientation. In block 406 the beamsplitter is used to acquire information corresponding to the first orientation. When the beamsplitter is used in conjunction with an array of photodiodes, the information can correspond to amount or intensity of the reflected back-scattered light incident upon the photodiodes during an exposure period.

Figure 5:
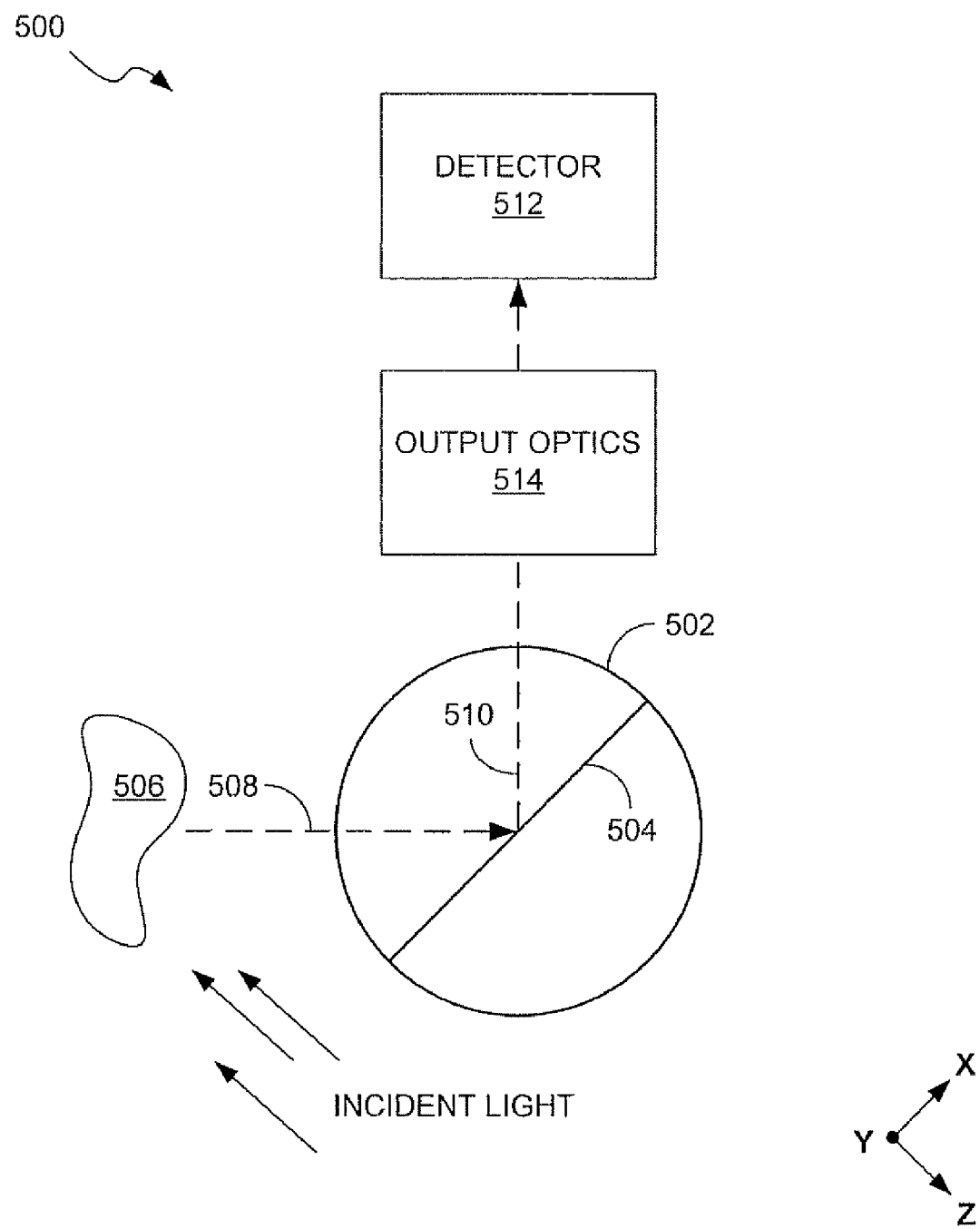
FIG. 5 is a schematic diagram depicting another embodiment of an optical system that incorporates an embodiment of a cylindrically shaped optical beamsplitter.

An embodiment of an optical system including a cylindrically shaped optical beamsplitter is shown in FIG. 5. Optical system 500 includes a beamsplitter 502 incorporating a partially-reflective layer 504. An external light source (not shown) illuminates sample 506. A portion of the light provided by the external source is incident upon the sample, with some of the incident light scattered back to the beamsplitter. Scattered ray 508 is scattered from the sample 506 to the beamsplitter 502. The scattered ray 508 is then reflected by the partially-reflective layer 504, with a scattered reflected ray 510 provided to a detector 512 via optional output optics 514.

Many variations and modifications may be made to the above-described embodiments. All such modifications and variations are intended to be included within the scope of the invention as defined by the following claims.

What is claimed is:

1. An optical beamsplitter comprising:
an optically-transparent material having a first end, a second end and a cylindrically shaped exterior surface extending between the first end and the second end, the first end, the second end and the cylindrically shaped exterior surface defining an interior wherein the cylindrically shaped exterior surface extending between the first end and the second end is defined by a substantially constant radius (r) extending from the longitudinal axis of the optical beamsplitter; and
a partially-reflective layer located within the interior.

2. The optical beamsplitter of claim 1, wherein the optically-transparent material defines a center, and the partially-reflective layer is substantially planar and intersects the center.

3. The optical beamsplitter of claim 1, wherein the optically-transparent material is transparent to more than at least one wavelength of light.

4. The optical beamsplitter of claim 3, wherein the optically-transparent material is transparent to visible light.

5. The optical beamsplitter of claim 1, wherein the optical beamsplitter is rotatable with respect to at least one axis of rotation.

6. The optical beamsplitter of claim 1, wherein the cylindrically shaped exterior surface extending between the first end and the second end is defined by a substantially constant radius (r) extending from the longitudinal axis of the optical beamsplitter.

7. The optical beamsplitter of claim 1, wherein the optical beamsplitter comprises a longitudinal axis (L) that extends from the center of the first end to the center of the second end and the cylindrically shaped exterior surface extending between the first end and the second end is defined by a substantially constant radius (r) extending from the longitudinal axis.

8. The optical beamsplitter of claim 1, wherein light incident upon the optical beamsplitter is received at an angle normal to the exterior surface of the optical beamsplitter.

9. The optical beamsplitter of claim 8, wherein light propagated from the optical beamsplitter is transmitted at an angle normal to the exterior surface of the optical beamsplitter.

10. The optical beamsplitter of claim 9, wherein some of the light received and transmitted is propagated without distortion.

11. The optical beamsplitter of claim 1, wherein light incident upon the optical beamsplitter is received at an angle normal to the exterior surface of the optical beamsplitter and light propagated from the optical beamsplitter is transmitted at an angle normal to the exterior surface of the optical beamsplitter.

12. The optical beamsplitter of claim 11, wherein some of the light received and transmitted is propagated without distortion.

13. A method for scanning a sample with an optical beamsplitter, the beamsplitter including an optically-transparent material having a cylindrically shaped exterior surface and a partially-reflective layer, the beamsplitter rotatable about an axis;
the method comprising the steps of:
rotating the optical beamsplitter to a first orientation with respect to a sample;
passing light through the optical beamsplitter to the sample and receiving light reflected therefrom; and
acquiring first information corresponding to the first orientation.

14. The method of claim 13, further comprising:
rotating the optical beamsplitter to a second orientation with respect to the sample, and acquiring second information corresponding to the second orientation.

15. The method of claim 13, wherein information corresponds to an amount of light scattered from the sample and reflected by the optical beamsplitter.

16. An optical beamsplitter comprising:
a material that is optically transparent to at least one wavelength of light, the optical beamsplitter further comprising a first end, a second end, a longitudinal axis (L) extending from the center of the first end to the center of the second end and a cylindrically shaped exterior surface extending between the first end and the second end that is defined by a substantially constant radius (r) extending from the longitudinal axis, the first end, the second end and the cylindrically shaped exterior surface defining an interior; and
a partially-reflective layer located within the interior.

17. The optical beamsplitter of claim 16, wherein the optical beamsplitter is a circular cylinder.

18. The optical beamsplitter of claim 17, wherein the optical beamsplitter is a right circular cylinder.

19. The optical beamsplitter of claim 16, wherein the partially-reflective layer is substantially planar and the longitudinal axis (L) lies within the plane of the partially-reflective layer.

20. The optical beamsplitter of claim 16, wherein the optical beamsplitter is rotatable with respect to the longitudinal axis (L).

* * * * *